United States Patent
Milark et al.

(10) Patent No.: US 8,244,457 B2
(45) Date of Patent: Aug. 14, 2012

(54) DEVICE FOR A MOTOR VEHICLE

(75) Inventors: Andreas Milark, Wolfsburg (DE); Michael Rohlfs, Rötjesbüttel (DE); Sven Chlosta, Calberlah (DE)

(73) Assignee: Volkswagen AG, Wolfsburg (DE)

( * ) Notice: Subject to any disclaimer, the term of this patent is extended or adjusted under 35 U.S.C. 154(b) by 915 days.

(21) Appl. No.: 11/659,516

(22) PCT Filed: Jul. 15, 2005

(86) PCT No.: PCT/EP2005/007728
§ 371 (c)(1),
(2), (4) Date: Aug. 30, 2007

(87) PCT Pub. No.: WO2006/015687
PCT Pub. Date: Feb. 16, 2006

(65) Prior Publication Data
US 2008/0033647 A1 Feb. 7, 2008

(30) Foreign Application Priority Data

Aug. 5, 2004 (DE) .......................... 10 2004 037 992
Sep. 25, 2004 (DE) .......................... 10 2004 046 589

(51) Int. Cl.
*G06F 17/10* (2006.01)
*F02D 9/02* (2006.01)
(52) U.S. Cl. ........................ 701/301; 123/349
(58) Field of Classification Search ............ 701/91, 701/93, 200–226, 300–302, 400–541; 123/349; 180/170
See application file for complete search history.

(56) References Cited

U.S. PATENT DOCUMENTS

| | | | |
|---|---|---|---|
| 4,326,273 A | 4/1982 | Vancha | |
| 4,500,977 A | 2/1985 | Gelhard | |
| 4,785,429 A | 11/1988 | Folwell et al. | |
| 4,931,930 A | 6/1990 | Shyu et al. | |
| 5,508,974 A * | 4/1996 | Meyer et al. | 367/99 |
| 5,701,122 A * | 12/1997 | Canedy | 340/932.2 |
| 6,856,874 B2 | 2/2005 | Weilkes et al. | |
| 7,230,640 B2 * | 6/2007 | Regensburger et al. | 348/115 |
| 2003/0210157 A1* | 11/2003 | Gotzig et al. | 340/932.2 |
| 2005/0035879 A1 | 2/2005 | Gotzig et al. | |

FOREIGN PATENT DOCUMENTS

DE   38 13 083   11/1989

(Continued)

OTHER PUBLICATIONS

International Search Report, PCT International Patent Application No. PCT/EP2005/007728, dated Nov. 24, 2005.

(Continued)

*Primary Examiner* — James Trammell
*Assistant Examiner* — Muhammad Shafi
(74) *Attorney, Agent, or Firm* — Kenyon & Kenyon LLP

(57) ABSTRACT

A device for a motor vehicle includes at least one distance sensor for recording a predominantly lateral clearance between the motor vehicle and objects, and a control device for controlling the distance sensor, the distance sensor emitting measuring signals during an activation time, and receiving measuring signal reflected by at least one object during a measurement receiving time. In the process, the measurement receiving time of the distance sensor is modifiable by the control device.

8 Claims, 3 Drawing Sheets

FOREIGN PATENT DOCUMENTS

| | | |
|---|---|---|
| DE | 43 35 728 | 4/1995 |
| DE | 102 25 614 | 12/2003 |
| EP | 0 048 958 | 4/1982 |
| EP | 0 305 907 | 3/1989 |
| WO | WO 02/084329 | 10/2002 |
| WO | WO 03/087874 | 10/2003 |

OTHER PUBLICATIONS

Written Opinion of the International Searching Authority, PCT International Patent Application No. PCT/EP2005/007728, dated Nov. 24, 2005 (English-language translation provided).

* cited by examiner

DEVICE FOR A MOTOR VEHICLE

FIELD OF THE INVENTION

The present invention relates to a device for a motor vehicle, the device including at least one distance sensor to record a predominantly lateral distance between the motor vehicle and objects, and a control device to control the distance sensor, the distance sensor emitting measuring signals during an activation time, and receiving the measuring signal reflected by at least one object during a measurement receiving time.

BACKGROUND INFORMATION

A driver assistance system for a motor vehicle, which includes at least one sensor for measuring the distance of the vehicle from an object, and a control unit for controlling functional groups of the motor vehicle as a function of the measuring result of the sensor, is described in PCT International Published Patent Application No. WO 02/084329. The control unit may be switched between a parking assistance operating mode and a pre-crash operating mode as a function of the velocity of the vehicle. The switchover between a speed control operating mode and the pre-crash operating mode depends on the movement of an object relative to the motor vehicle, which is measured by a sensor.

A parking assistance device for motor vehicles is described in European Published Patent Application No. 0 305 907. The motor vehicle has a transmitter disposed on the vehicle exterior, which emits a transmission signal radiated in the direction of a parking slot, and an associated receiver receives the reflected signal. The transmission signal is restricted to a small radiation angle and emitted transversely to the longitudinal axis of the motor vehicle, so that the reflected signals in the region of the parking slot, acquired while driving past the parking slot, differ clearly from the reflected signal outside the parking slot. On the basis of this clear signal difference the length of the parking slot is determined in a comparison device, taking a distance signal into account.

PCT International Published Patent Application No. WO 03/087874 describes a method for operating a parking assistance system for a vehicle, which has at least one distance sensor, which at least sectionally records the lateral close range of the vehicle. The vehicle also has a distance sensor, and a control device determines the length or width of the parking slot from the values of the sensors recorded while driving past the parking slot. In the process, the length or width of the parking slot is corrected by a correction value, and the measurement is implemented with the aid of a distance sensor at different time intervals, depending on the speed of the vehicle while driving past the parking slot.

SUMMARY

Example embodiments of the present invention may improve the measuring of a potential parking slot for a motor vehicle.

According to example embodiments of the present invention, the control device is able to modify the measurement receiving time of the distance sensor. Using a sound velocity that is to be considered constant, the distance measurement may be varied in that a different measurement receiving time is able to be set. If the measurement receiving time is selected to be low, a rapid repeat of the measurement is possible. With longer measurement receiving times, the repeat rate of the measurement falls. In a moving vehicle, this also reduces the resolution accuracy in the driving direction since a distance that is a function of the driving speed is traveled during the course of the measurement. With a high repeat rate, the beginning and the end of a parking slot are able to be measured in an especially satisfactory and precise manner. The most accurate measurement possible is especially important whenever the parking slot has a length in the range of the minimally required parking slot length, the minimally required parking slot length depending on the vehicle type and/or possible loading (for instance, bicycle carrier on a trailer hitch or on a trunk lid). To provide the vehicle driver with precise information as to whether a parking slot of sufficient size is at hand, the measurement receiving time of the distance sensor is able to be modified.

The measurement receiving time may be modifiable between at least two settings for the receiving times. It may be provided that the control device is able to modify the measurement receiving time such that a distance of less than one vehicle width is monitored, e.g., up to approximately 1.5 m. While searching for a parking slot, a vehicle is driving past parked vehicles and is able to detect the end of a parked vehicle in an especially precise manner due to a low or short measurement receiving time. Normally, the vehicle searching for a parking slot is driving past already parked vehicles at a distance of less than one vehicle width, so that a measurement receiving time for recording this distance range is sufficient and advantageous.

The control device may be able to modify the measurement receiving time such that a distance of less than two vehicle widths, e.g., up to approximately 3.5 m, is monitored. If the vehicle searching for a parking slot detects a potential parking slot, objects outside this potential parking slot are usually of no importance. Monitoring of less than two vehicle widths may be suitable.

Since the control device modifies the measurement receiving time for measuring the length of a potential parking slot, the beginning and the end of the parking slot are able to be detected in an especially precise manner. Also important while measuring the parking slot is the course or the distance of a possibly present curb. When a curb is detected, the vehicle is able to use this curb for orientation in a subsequent parking operation, and possibly utilize it for alignment (parked state). Instead of the curb, the course of other objects or obstacles (such as guardrails, fences, etc.) may be detected as well.

Since at least one distance sensor of the motor vehicle is configured as ultrasonic sensor, which measures the parking slot, a cost-effective and widely used distance sensor is able to be utilized to measure a parking slot.

In order to detect a curb or a road boundary within at least one of the measurement receiving times, the distance sensor inside the vehicle is disposed such that it is able to detect an object having the height of a common curb. To this end, the radiation cone of the distance sensor must detect the curb within one of the measurement receiving times such that reflected sensor radiation is received by the distance sensor.

Road boundaries may also be guardrails, walls, posts, fences, plantings, such as bushes or hedges, road lane markings, etc. If the course of a clearance relative to an object and/or a road boundary is able to be recorded by at least one distance sensor and/or by the control device, it is possible to align the parking vehicle on the basis of this course of the clearance.

The measurement receiving time may be modifiable as a function of the speed and/or the vehicle environment and/or the position. To this end, it is possible to determine, for instance on the basis of the vehicle speed alone, whether a modification of the measurement receiving time or an activation of the distance sensor may be provided, since parking operations usually take place at low speed. The measurement receiving time is also able to be modified on the basis of the vehicle environment such as, for example, vehicles parked along the side of the road, e.g., when potential parking slots are detected. This also applies to a possible position dependency of the measurement receiving time. If the vehicle is in a particular position relative to a potential parking slot, the measurement receiving time is modified in order to determine the beginning and end of this parking slot as precisely as possible. It is also possible for the vehicle driver to actively switch into a parking slot search mode, or to deliberately deactivate such. In this mode, the distance sensor emits the aforementioned signals in order to measure the parking slot.

It may be apparent from the driving behavior of the vehicle driver that he or she is in search of a parking slot. In this instance, the system may be activated automatically and the measurement receiving time be modified to measure a parking slot.

A parking slot whose length is sufficient for the vehicle may be signaled to the vehicle driver acoustically and/or optically and/or haptically. It may be provided that the stored value of the minimally required parking slot length is able to be adjusted in the motor vehicle, i.e., is modifiable. The reason for this may be that some vehicle drivers feel more comfortable during the parking operation if they have additional maneuvering space available. However, this may also be provided if possible loading and unloading or the opening of a door or hatch requires additional space. Only the setting of a value that is greater than the length required by the vehicle may be provided in this context. A setting and/or visualization of the parking slot and/or the minimally required parking slot may be implemented via, for instance, a multi-function operating device as already realized in vehicles having combined navigation and radio and/or telephone devices. Furthermore, the device may be supplemented by a camera system, which records the parking slot continuously or by a one-time image in order to offer the vehicle driver a visualization of the potential parking slot. It is possible, for instance, that additional markings are present in the parking slot or on separate signs (such as handicapped parking), which the vehicle driver is able to perceive from this supplementary information.

To measure a potential parking slot by a motor vehicle driving past the parking slot, the measurement receiving time for measuring the length of a parking slot is modified; the length of the parking slot is determined by a detection device inside the motor vehicle, and measuring signals are emitted by a distance sensor during an activation period, and measuring signals reflected at objects are recorded by the distance sensor within a measurement receiving time. This allows the moving vehicle to measure a beginning and an end of a parking slot in an especially precise manner. Since the measurement receiving time is increased or set to a maximum value when a beginning of the parking slot is detected, the potential parking area may subsequently be monitored for the presence of objects. In addition, it is possible to detect the course of a road or a curb in the monitored distance range.

Since, while driving past the parking slot, the measurement receiving time is reduced or set to a minimum value in front of a minimally required parking slot length or within the range of the minimally required parking slot length, the distance measurement can be carried out at a high repeat rate. This leads to the highest possible resolution (accuracy) in recording the length of the parking slot in the driving direction for the vehicle driving past the parking slot.

Since, once an additional length adjacent to the minimum parking slot length has been reached, the measurement receiving time is increased only if no object is detected in a potential parking area of the motor vehicle, it may be provided to resume monitoring of a larger detection range again for the presence of objects. In this manner, a curb that is located further away, next to the parking slot, or the course of the road is able to be recorded. As soon as the minimally required parking slot length has been reached, it is apparent that the vehicle will definitely fit into the parking slot passed, so that the detection of a possible object, such as a curb, having a longer measurement receiving time may be resumed again.

If the measurement receiving time for object detection is modified in a variable manner, an object detection may be implemented at an optimal or adapted measurement repeat rate as a function of the situation. For instance, if an object is detected, the measurement receiving time may be set such that only objects up to this distance range are recorded. This allows a repeat rate of the measurement that is at its maximum for this particular situation. A course of the clearance in the driving direction therefore has the highest possible precision (as many recording points or as much recording data as possible).

Furthermore, it may be provided that the orientation of the distance sensor in the vehicle is selected such that, if the measurement receiving time is set to high, a curb is detected as object. A measuring cone emitted by the distance sensor then intersects with a curb, which is thereby detectable. It may be provided that the principal beam direction of the distance sensor in the vehicle is inclined relative to the road surface.

It is also possible to use an additional distance sensor, which is capable of detecting or curb or an object in a different distance range. The principal beam direction of this sensor differs from that of the first sensor. It is possible to use different measurement receiving times for the distance sensors.

DETAILED DESCRIPTION

Figure 1:
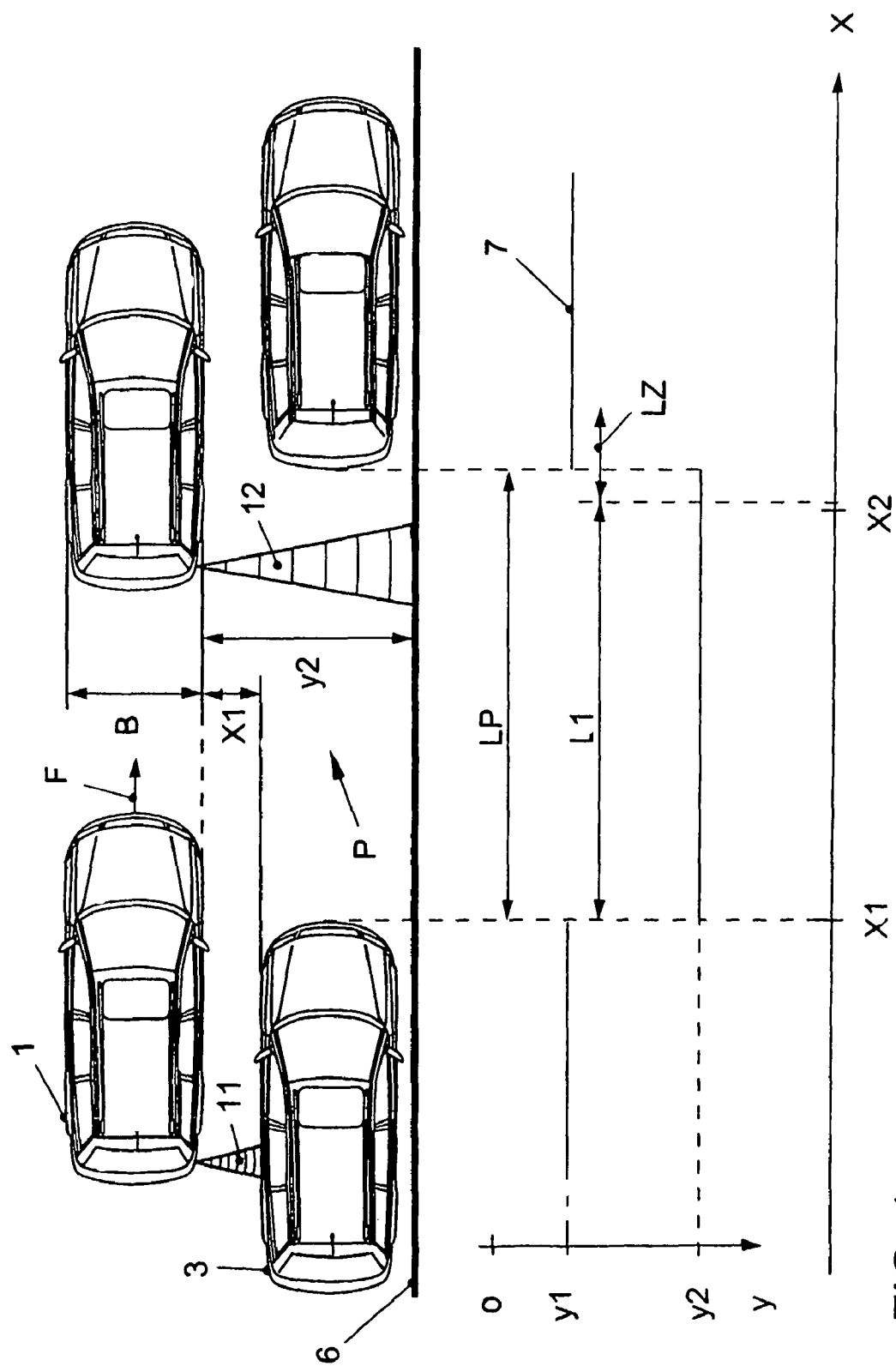
FIG. 1 is a schematic illustration of the measuring of a potential parking slot according to an example embodiment of the present invention.

FIG. 1 shows a schematic representation of the process of measuring a potential parking slot 8 according to an example embodiment of the present invention. A motor vehicle 1 is driving past an object 3 in driving direction F. Motor vehicle 1 has a clearance Y1 with respect to object 3. Distance sensor 2 illustrated in FIG. 2 measures this distance, sensor radiation range 11 detecting object 3. The reflected sensor radiation is recorded by distance sensor 2 during measurement receiving time T2. In the driving situation illustrated on the left in FIG. 1, where an object 3 was detected by distance sensor 2, the distance measurement is repeated at a low measurement receiving time T2. Distance sensor 2 or a post-connected control device 4 is therefore able to record the beginning of a parking slot P at location X1 with high precision. The beginning of parking slot P is marked by X1 on the distance axis X in the lower region of FIG. 1. As soon as motor vehicle 1 or control device 4 of distance sensor 2 detects the beginning of parking slot P, measurement receiving time T2 is modified. Measurement receiving time T2 is increased in this driving situation. With the aid of increased measurement receiving time T2, distance sensor 2 is also able to record objects 3 that are further away. In the situation depicted in FIG. 1, distance sensor 2 detects a curb 6 inside parking slot P or, to be more precise, within minimally required parking slot length L1. It is possible that distance sensor 2 or control device 4 detects only the particular distance Y2 relative to curb 6. However, it is also possible that the course of clearance 7 is recorded while driving past parking slot P and correspondingly stored, and possibly analyzed in addition. By an automatically implemented or driver-assisted parking operation, control device 4 is able to carry out an alignment along curb 6 or along objects 3 or the road boundaries. In a driver-assisted parking operation, control device 4 or an additional control device is able to provide the vehicle driver with steering suggestions, or to implement the steering operation independently. In the latter case, the vehicle driver retains control during driving by actuating the accelerator or braking pedal. An automatic parking mode without driver interventions is implementable as well.

Shortly before motor vehicle 1 has reached minimally required parking slot length L1, measurement receiving time T2 is reduced. In FIG. 1, this changeover point is shown by X2 on distance axis X. This shift in measurement receiving time T2 is made because it is then possible to detect with high accuracy whether an object 3 is present still within minimally required parking slot length L1, or whether a parking operation into parking slot P is able to be implemented without risk. Since motor vehicle 1 is moving in driving direction F at a finite driving speed, distance X is covered between two measurements. If a low measurement receiving time T2 and repeated measurements are employed, then the distance between the measuring locations in the X direction may be reduced. The resolution in the X direction increases thereby since as many measuring points or as much measuring information as possible are/is recorded. It may be provided to terminate a measurement if a speed and/or acceleration threshold is exceeded because it must be assumed that the vehicle driver has no parking intention.

Furthermore, FIG. 1 shows a schematic course of clearance 7 underneath curb 6. While motor vehicle 1 is driving past object 3 on the left, a clearance Y1 is measured. Parking slot P, which is delimited by curb 6 in the Y direction, begins at the location denoted by X1. The curb has a clearance Y2 with respect to vehicle 1. Parking slot P has a parking slot length LP, the minimally required parking slot length L1 of motor vehicle 1 being shorter than parking slot length LP. Parking of motor vehicle 1 in parking slot P would therefore be possible. Adjacent to minimally required parking slot length L1 is additional length LZ within which the low measurement receiving time for object detection is maintained. If no object 3 is detected inside additional length LZ either, then measurement receiving time T2 is increased again in order to detect a curb 6 or the course of a curb, for example. The increase in measurement receiving time T2 may be implemented because motor vehicle 1 fits into parking slot P and a less precise detection of the parking slot end is acceptable. It is possible to specify additional length LZ such that it compensates for the greater imprecision resulting from higher measurement receiving time T2. To compensate for the imprecision, additional length LZ may be adapted in a variable manner in the driving direction or in (driving speed) stages as a function of the measurement resolution. Measurement receiving time T2 and the vehicle speed are entered in the measurement resolution in the driving direction.

Figure 2:
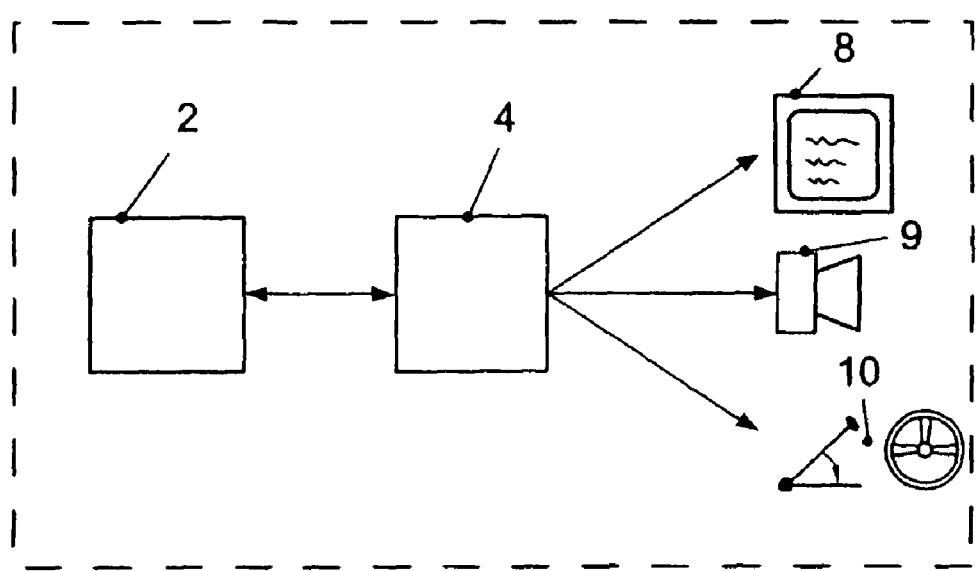
FIG. 2 is a schematic representation of the driver assistance system according to an example embodiment of the present invention.

FIG. 2 shows a basic representation of the device according to an example embodiment of the present invention. The device, which is configured as driver assistance system, for instance, is disposed inside a motor vehicle 1 represented by a dashed rectangle in FIG. 1. A distance sensor 2 records distance data of possible objects 3 and transmits this data to control device 4. Control device 4 is able to process this information for the driver by displaying course of clearance 7 or steering instructions for parking motor vehicle 1 on an optical display unit, for instance, or by confirming a parking slot length LP that is greater than minimally required parking slot length L1. It is also possible that information regarding parking slot P or regarding the parking operation is output by an acoustic indicator device (such as a loudspeaker). A haptic indicator device 10, shown in FIG. 1 by a symbolized accelerator and a steering wheel, are able to provide the vehicle driver with important information concerning a parking operation. For example, haptic feedback may be output when measured parking slot P is smaller than minimally required parking slot length L1 and the vehicle driver commences a parking operation nevertheless, or if the vehicle driver is driving too fast for a safe parking operation, or if a minimum parking slot length has been reached. In this situation, the accelerator may exhibit, for instance, a marked resistance (counter pressure or vibrating) if the vehicle driver attempts to exceed a maximum parking speed.

Figure 3:
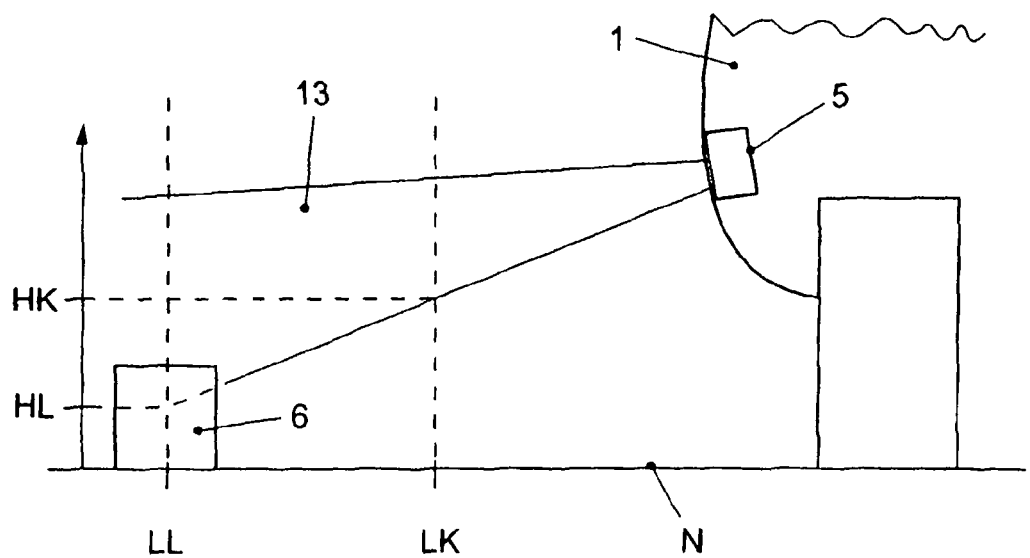
FIG. 3 is a schematic representation of the orientation of a distance sensor in a motor vehicle, for detecting a curb.

FIG. 3 shows a schematic representation of the alignment of a distance sensor 2 in a motor vehicle 1 for recording a curb 6. In this exemplary embodiment, distance sensor 2 is installed in motor vehicle 1 as ultrasonic sensor 5. This 1 is illustrated in FIG. 3 in a cutaway view by a vehicle wheel situated at road level, with adjacently extending vehicle body. Ultrasonic sensor 5 emits sonic waves within a sensor radiation range 13. This sensor radiation range 13 may propagate in conical form from the direction of ultrasonic sensor 5. If control device 4 sets a short or low measurement receiving time T2, reflected ultrasonic signals up to a range LK may be detected from the direction of motor vehicle 1. At higher or greater measurement receiving time T2, this detection range reaches up to range LL. In FIG. 3, the minimum object heights at the particular ranges at short or long measurement receiving times LK and LL are indicated by HK and HL, respectively, using corresponding dashed lines. Due to the inclined installation of ultrasonic sensor 5, minimum detection height HL is configured such that a curb 6 is able to be detected at long measurement receiving time T2. As a result, distance sensor 2 is able to detect a curb 6 or a course of the curb in the area of range LL. Radar sensors and/or laser sensors may also be employed as distance sensors.

Figure 4:
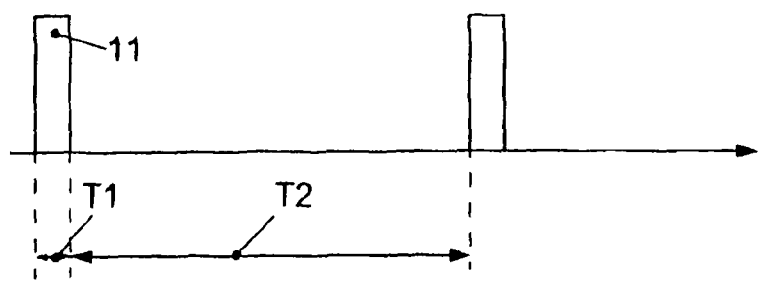
FIG. 4 illustrates the sequence of activation time and measurement receiving time.

FIG. 4 shows a basic representation of the sequence of activation time T1 and measurement receiving time T2. At the start of the measurement, measuring signal M, which may be emitted in the form of a pulse, is emitted during an activation time T1. Activation time T1 is followed by a measurement receiving time T2 during which reflected sensor radiation is recorded. Following activation time T1 and measurement receiving time T2, one measuring cycle is completed. Additional measuring cycles may follow this measuring cycle, either directly or after a pause. In order to increase the precision of a moving motor vehicle 1, measurement receiving time T2 is modified. It is also possible that activation time T1 is modified by itself or together with measurement receiving time T2.

LIST OF REFERENCE CHARACTERS 1 motor vehicle
2 distance sensor
3 object
4 control device
5 ultrasonic sensor
6 curb
7 course of clearance
8 optical indicator device
9 acoustic indicator device
10 haptic indicator device
11, 12, 13 sensor radiation range
B vehicle width
F driving direction
HK minimum recording height short receiving time
HL minimum recording height long measurement receiving time
L1 minimum parking slot length
LK range short measurement receiving time
LL range long measurement receiving time
LP parking slot length
LZ additional length
M measuring signal
N road level
P parking slot
T1 activation time
T2 measurement receiving time
X, X1, X2 distance axis
Y, Y1, Y2 clearance

What is claimed is:

1. A method of measuring a potential parking slot by a motor vehicle driving past the parking slot, comprising:
   modifying a measurement receiving time to measure a parking slot length;
   determining the length of the parking slot by a detection device in the motor vehicle;
   emitting measuring signals by a distance sensor during an activation time; and
   recording the measuring signals reflected by objects by the distance sensor during the measurement receiving time;
   wherein the measurement receiving time is an entire time duration between activation times of the emitted measuring signals.

2. The method according to claim 1, wherein the measurement receiving time is at least one of (a) increased and (b) set to a maximum value after a beginning of the parking slot is detected.

3. The method according to claim 1, wherein the measurement receiving time is at least one of (a) reduced and (b) set to a minimum value while at least one of (a) driving past the parking slot, (b) in front of a minimally required parking slot length and (c) in a range of the minimally required parking slot length.

4. The method according to claim 3, wherein, after reaching an additional length adjoining the minimally required parking slot length, the measurement receiving time is increased only if no object is detected in a potential parking area of the motor vehicle.

5. The method according to claim 4, wherein, following a further additional length adjoining the minimally required parking slot length, the measurement receiving time is increased if by then no object is detected in the potential parking area.

6. The method according to claim 1, wherein the measurement receiving time is modified in a variable manner for object detection.

7. The method according to claim 1, wherein an alignment of the distance sensor in the motor vehicle is selected to detect a curb as an object when the measurement receiving time is set to high.

8. A method of measuring a potential parking slot by a motor vehicle driving past the parking slot, comprising:
   modifying the measurement receiving time to measure a parking slot length;
   determining the length of the parking slot by the detection device in the motor vehicle;
   emitting measuring signals by the distance sensor during an activation time; and
   recording the measuring signals reflected by the objects by the distance sensor during the measurement receiving time;
   wherein the measurement receiving time is an entire time duration between activation times of the emitted measuring signals
   wherein the method is performed using a device including:
      at least one distance sensor configured to record a predominantly lateral clearance between the motor vehicle and the objects, the distance sensor configured to emit measurement signals during the activation time and to receive the measurement signal reflected by at least one object during a reception time; and
      a control device configured to control the distance sensor;
      wherein the measurement reception time of the distance sensor is modifiable by the control device.

* * * * *